(12) United States Patent
Stigsson et al.

(10) Patent No.: US 10,138,578 B2
(45) Date of Patent: Nov. 27, 2018

(54) ALKALI RECYCLE IN CELLULOSE SPINNING PROCESS

(71) Applicant: TreeToTextile AB, Bjärred (SE)

(72) Inventors: Lars Stigsson, Bjärred (SE); Bengt Hagström, Göteborg (SE); Tobias Köhnke, Göteborg (SE); Artur Hedlund, Göteborg (SE); Marta Bialik, Sköndal (SE)

(73) Assignee: TREETOTEXTILE AB, Bjärred (SE)

( * ) Notice: Subject to any disclaimer, the term of this patent is extended or adjusted under 35 U.S.C. 154(b) by 301 days.

(21) Appl. No.: 14/900,904

(22) PCT Filed: Jun. 27, 2014

(86) PCT No.: PCT/EP2014/063777
§ 371 (c)(1),
(2) Date: Dec. 22, 2015

(87) PCT Pub. No.: WO2015/000820
PCT Pub. Date: Jan. 8, 2015

(65) Prior Publication Data
US 2016/0138200 A1 May 19, 2016

Related U.S. Application Data

(60) Provisional application No. 61/841,470, filed on Jul. 1, 2013.

(51) Int. Cl.
*D01F 13/02* (2006.01)
*C01D 1/28* (2006.01)
(Continued)

(52) U.S. Cl.
CPC ............... *D01F 13/02* (2013.01); *C01D 1/28* (2013.01); *C01D 5/006* (2013.01); *C08B 16/00* (2013.01); *D01F 2/02* (2013.01); *Y02P 70/627* (2015.11)

(58) Field of Classification Search
CPC .. D01F 13/02; D01F 2/02; C01D 1/28; C01D 5/006; C08B 16/00; Y02P 70/627
(Continued)

(56) References Cited

U.S. PATENT DOCUMENTS 2,231,927 A  2/1941 Lilienfeld
2,265,916 A  12/1941 Lilienfeld
(Continued)

FOREIGN PATENT DOCUMENTS

GB  470746 A  8/1937
GB  472888 A  9/1937
(Continued)

OTHER PUBLICATIONS

International Search Report, dated Sep. 18, 2014 in connection with PCT International Application No. PCT/EP2014/063777, filed Jun. 27, 2014.
(Continued)

*Primary Examiner* — Dennis R Cordray
(74) *Attorney, Agent, or Firm* — John P. White; Cooper & Dunham LLP

(57) ABSTRACT

The present invention concerns a method for the recovery of solvent in a process for preparation of regenerated cellulosic fibers using sodium hydroxide as solvent for cellulose dissolving in the manufacturing of a cellulose spinning dope wherein sodium hydroxide present in the spinning dope is at least partially recovered and recycled as sodium hydroxide from a cellulose fiber regeneration or cellulose coagulation step and wherein said cellulose fiber regeneration or cellulose coagulation step consists of a bath into which cellulose spinning dope is injected. Recovered sodium hydroxide may be directly or indirectly recycled from a cellulose fiber regeneration or cellulose coagulation step to a cellulose dissolving step.

18 Claims, 1 Drawing Sheet

(51) Int. Cl.
*C08B 16/00* (2006.01)
*C01D 5/00* (2006.01)
*D01F 2/02* (2006.01)

(58) Field of Classification Search
USPC ............... 162/129, 141; 106/162.1, 166.01,
106/168.01, 204.01; 264/187
See application file for complete search history.

(56) References Cited

U.S. PATENT DOCUMENTS

| | | | | |
|---|---|---|---|---|
| 2,283,809 | A | * | 5/1942 | Izard .................. C08L 1/28 |
| | | | | 264/187 |
| 2,296,857 | A | * | 9/1942 | Lilienfeld ............. D01F 2/08 |
| | | | | 106/162.6 |
| 2,335,126 | A | | 11/1943 | Abel et al. |
| 2,447,757 | A | | 8/1948 | Lilienfeld |
| 2,477,756 | A | | 8/1948 | Lilienfeld |
| 4,639,514 | A | | 1/1987 | Turunen et al. |
| 4,639,515 | A | | 1/1987 | Turunen et al. |
| 2012/0000621 | A1 | * | 1/2012 | Stigsson ............... C08B 16/00 |
| | | | | 162/158 |

FOREIGN PATENT DOCUMENTS

| | | |
|---|---|---|
| GB | 472934 A | 9/1937 |
| GB | 2164941 A | 4/1986 |
| WO | WO 2013/124265 A1 | 8/2013 |

OTHER PUBLICATIONS

Nov. 7, 2016 Office Action in connection with Chinese Patent Application No. CN 201480036155.9.
He Fu, "Carbon Fibre and Graphite Fibre", Chemical Industry Press, p. 75, Jul. 2010, Beijing.
Suresh Ramalingam et al: "Fiber Spinning and Rheology of Liquid-Crystalline Polymers" Committee for Graduate Students, Massachusetts Institute of Technology, May 1994.

* cited by examiner

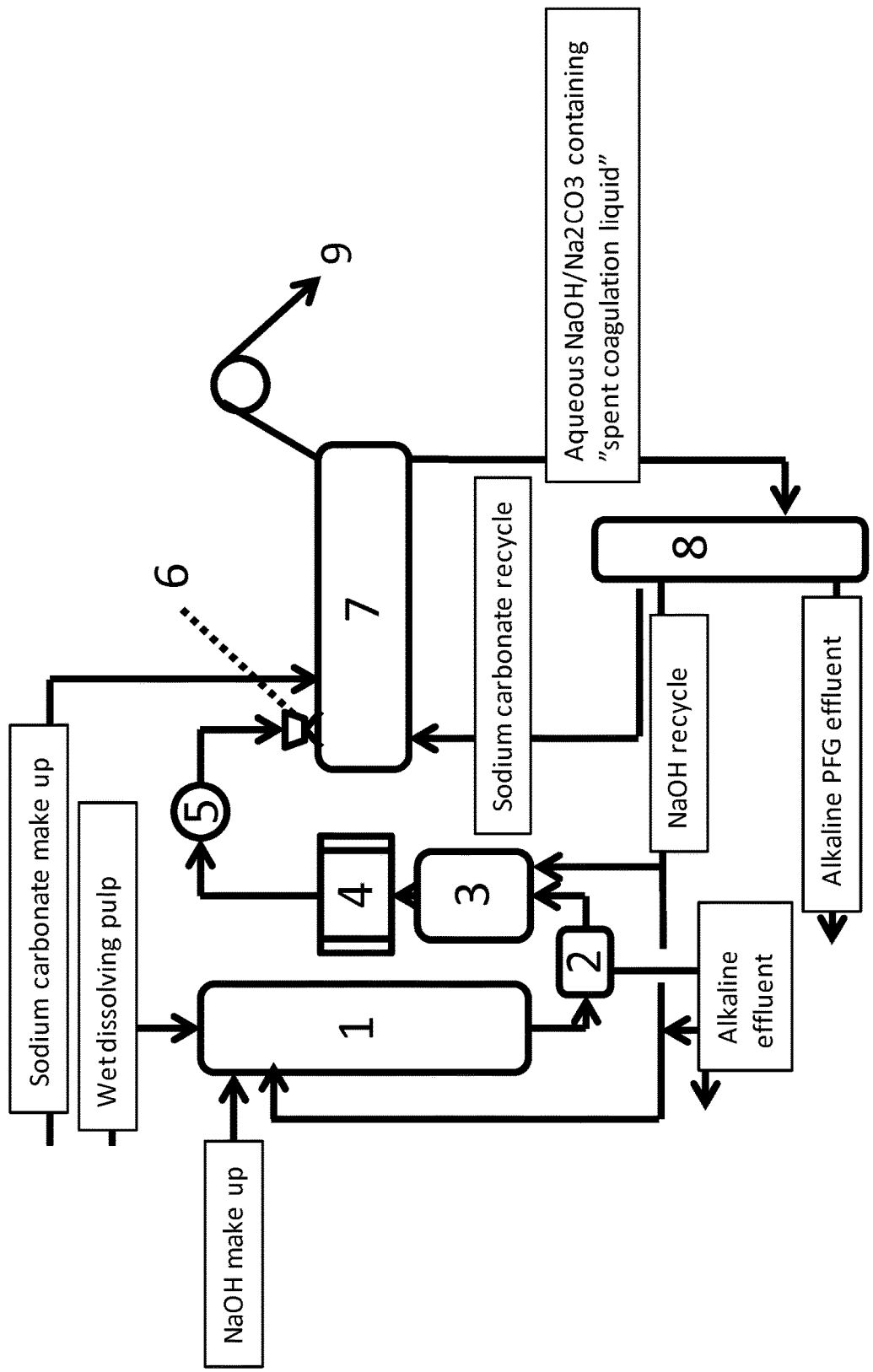

ALKALI RECYCLE IN CELLULOSE SPINNING PROCESS

CROSS-REFERENCE TO RELATED APPLICATIONS

This application is a § 371 national stage of PCT International Application No. PCT/EP2014/063777, filed Jun. 27, 2014, claiming the benefit of U.S. Provisional Application No. 61/841,470, filed Jul. 1, 2013, the contents of each of which are hereby incorporated by reference in their entirety.

FIELD OF THE INVENTION

The present method relates to a method for the recovering alkali, such as sodium hydroxide, in a process for preparation of regenerated cellulosic fibers, wherein an alkaline solvent is used in dissolving cellulose.

BACKGROUND

By dissolving cellulose in a solvent and subsequently injecting the thus formed spinning dope through a spinneret into a spinning or coagulation bath regenerating cellulosic fibers in the form of filaments may be formed. Various solvents have been used to dissolve cellulose in the art in such processes.

As an example, processes that employ aqueous sodium hydroxide as solvent for cellulose, wherein the sodium hydroxide subsequently are reformed and recycled are known. U.S. Pat. No. 4,639,514 discloses a solvent recovery process for recovery of fresh dissolving chemicals. The process is however based on the use of acids, such as carbon dioxide, which will neutralize the sodium hydroxide, thus requiring excessive and costly causticizing with lime to restore the alkalinity of the solvent.

Thus, there is a need for an alkaline cellulose dissolving and solvent recovery process, wherein the alkalinity of the solvent is kept high throughout the whole cycle without addition of acids.

BRIEF DESCRIPTION OF THE DRAWINGS

FIG. 1 shows schematically an alkaline recycle system, according to an embodiment of this disclosure;

EMBODIMENTS

The present invention thus provides a process for effective alkali recovery from the cellulose fiber regeneration steps, without substantial neutralization with acids. Further, spinning of cellulosic material employing alkaline cellulose solvents becomes more economical when effective alkali can be recovered without excessive formation of sodium sulfate or other sodium salts.

The present invention relates to a method for the recovery of solvent in a process for preparation of cellulosic fibers, typically regenerated cellulosic fibers, using sodium hydroxide as a component in the spinning dope wherein sodium hydroxide is at least partially recovered and recycled from a fiber regeneration or cellulose coagulation step, without substantial neutralization with acids. Primarily alpha cellulose, optionally derivatised cellulose, such as cellulose xanthate or cellulose carbamate, or other slightly derivatised cellulose, is dissolved in an alkaline aqueous solvent system, comprising sodium hydroxide (NaOH), to form a liquid (spinning dope). If derivatised cellulose is used for preparation of the spindope, new cellulosic fibers may either be reformed, still in derivatised form, under basic conditions in a subsequent cellulose fiber regeneration or coagulation step or become partially or fully underivatised in the coagulation step. The spinning dope is injected through a spinneret into a spinning or coagulation bath regenerating cellulosic fibers in the form of filaments. Besides sodium hydroxide, the spinning dope optionally comprises additives such as Zn or Al ions, urea, polyethylene oxide adducts and surfactants (viscosity modifiers, defoaming agents etc.). The concentration of cellulose in the alkaline spinning dope is in the range from 5 to 15% by weight. The relative configuration of the spinneret and the coagulation bath is traditionally selected from two main principles a) direct injection of the spinning dope through the spinneret into a coagulation bath b) air gap spinning wherein the spinneret face is arranged parallel to, and above, the bath liquid surface. While direct injection of the spinning dope into a coagulation bath is preferred, both spinneret configurations can be used when practicing the present invention.

In the cellulose fiber forming step or coagulation step, i.e. a step wherein cellulose or cellulose derivatives is coagulated to form fibers, following the spinneret (with or without an air gap) cellulosic filaments are formed. The coagulation bath contains a liquid that is not reacting with sodium hydroxide. Further, the coagulation bath may contain additives that are not reacting with sodium hydroxide. Examples of such additives are provided below. The pH of the liquid in the coagulation bath is preferably higher than about 6, such as higher than 7. More preferred the pH in the coagulation bath is above about 8 or even above 10. The alkalinity of the coagulation bath can be maintained or restored by causticizing with lime, borates or titanates. Sodium hydroxide liberated from the spinning dope during cellulose fiber regeneration is recovered from the coagulation step and is recycled for use, for example, for dissolving cellulose, bleaching cellulose or delignification of cellulosic material. The sodium hydroxide solution recovered from the coagulation step (spent coagulation liquid) is purified from salts, such as sodium carbonate and sodium sulphate and organic solvents by for example evaporation, crystallization, such as freeze crystallization, ion exchange, dialysis or by nanofiltration prior to reuse. Other coagulation additives, such as Zn compounds may be removed from the spent coagulation liquid by "kidneys" consisting for example of a filtration/precipitation step.

Apart from sodium hydroxide added to the coagulation bath by the spinning dope, the coagulation liquid is composed in such manner that it is a poor solvent for cellulose, whereby new fibers are formed during release of sodium hydroxide into the bulk of the coagulation bath. Therefore the coagulation liquid comprise one or more of water, diluted aqueous sodium hydroxide, organic solvents such as ethanol, isopropanol, acetone, and/or salts such as sodium carbonate, sodium sulfate, aluminum, and zinc salts.

The temperature in the coagulation bath is controlled so that optimum conditions for cellulose fiber regeneration are obtained. The congealed nascent cellulosic filaments are preferably stretched in the first coagulation bath or directly after the first coagulation bath in order to improve the fibers final tenacity. In some embodiments the nascent fibers are in this way subjected to a stretching (elongation) of 20 or 50 or 75 or 100%. After the coagulation bath the nascent fibers are subjected to subsequent washing in which the amount of non-aqueous compounds or moieties in the fibers is further reduced. The alkalinity of a washing liquid or washing liquids used to wash the regenerated cellulosic fibers can be restored by causticizing with lime, borates or titanates. In one embodiment the non-aqueous moieties entrained with the fibers from the coagulation bath are extracted and recycled from the liquid in the washing baths. Sodium hydroxide and sodium carbonate entrained with the fibers from the first coagulation bath into the washing bath can be recovered and combined with other liquids discharged from the spinning plant for upgrade to fresh chemicals.

In order to further improve the mechanical properties of the fibers a stretch is advantageously applied to the fibers in coagulation bath or after in or after the washing bath. In some embodiments this stretch is 5, 10, 20, 30, 40, 50, 60 and 75%. The filaments are thereafter subjected to further treatments such as spin finish application, crimping, cutting and drying etc. (given as examples without any specific order).

In a specific embodiment of the present invention the coagulation liquid is an aqueous solution comprising sodium carbonate or sodium sulphate. Preferably the sodium carbonate concentration is near its saturation concentration. The coagulation bath temperature is in the range of 20 to 40° C., preferably around 30° C. where sodium carbonate has good solubility. The sodium hydroxide concentration in the coagulation step is adjusted in order to secure a proper coagulation and fiber formation providing enough wet strength of the fiber. The average NaOH concentration in the coagulation bath is in the range 2 to 12% (by weight), preferably 5 to 9 wt %, or 2 to 6 wt %, and the sodium carbonate concentration is in the range of 15 to 45% (by weight), preferably 20 to 30 wt %.

At a higher NaOH concentration in the coagulation bath than about 6%, especially above 8%, the coagulation process becomes inconveniently slow and insufficient resulting in poor structural integrity of the spin line (the assembly of newly precipitated fibers travelling through the coagulation bath). In a preferred embodiment the concentrations of NaOH and sodium carbonate, respectively, in the coagulation bath are about 4% and about 20-26%, e.g. about 24%, respectively, wherein NaOH is continuously fed to the coagulation bath by means of the extrusion of spin dope into the coagulation bath.

One or more of water, aqueous solutions or slurries of sodium carbonate, sodium sulphate and/or coagulation additives may however be introduced into the coagulation bath at different locations in order to achieve the desired pH profile and buffering capacity of the coagulation liquid.

In order to prepare a fresh and substantially pure sodium hydroxide solution from the spent coagulation liquid, salts and additives is separated in one or more purification and separation steps prior to reuse. Salts such as sodium carbonate and/or sodium sulphate are advantageously separated from the spent coagulation liquid by utilizing the different solubility of sodium carbonate or sodium sulphate and sodium hydroxide in alkaline solutions. Particularly advantageous methods for separation of the salts present in the alkaline spent coagulation liquid include freeze crystallization, dialysis and nanofiltration. An evaporation step may be included in order to obtain the desired concentration of sodium hydroxide in the restored sodium hydroxide solution. Salts and additives removed by purification are at least partially recycled to the coagulation bath. Purified sodium hydroxide, optionally treated by lime (CaO), calcium hydroxide, titanates or borates for increasing alkalinity is at least partially recycled to a cellulose dissolving step.

The water balance in the process, i.e. the process of cellulose dissolving in sodium hydroxide solution and purification of spent coagulation liquid containing sodium hydroxide, can be maintained by vaporization, i.e. evaporation.

Spinning and initial regeneration of cellulosic fibers in accordance with the present invention can be performed in a flat bath wherein the front face of the spinneret is vertical and the filaments are taken up almost horizontally through the first coagulation bath. Spinning can be performed in a deep bath wherein the spinneret is submerged and facing up. The cellulosic filaments are drawn upwards through the coagulation liquid. Depending on the density of the coagulation media the spinning can be performed in a deep bath wherein the spinneret is submerged and facing down. The cellulosic filaments are drawn downwards through the coagulation liquid. The spinneret can be arranged in a funnel or cone wherein the yarn and coagulation liquid travel co-currently in order to pre-stretch the yarn or to obtain a small speed difference between filaments and the coagulation liquid.

When using an air gap spinneret, the filaments first pass through a gap either of air or a protective gas before they are directed or drawn downwards into the coagulation bath or funnel/cone coagulation configuration. The temperature of the gas is controlled in order to obtain the desired degree of stretch in the air gap. The width of the gap can be anywhere from about 1 mm to 1000 mm. Air gap spinning of the cellulose dope can advantageously be combined with funnel or cone configuration of the coagulation bath.

Depending on the concentration of cellulose in the sodium hydroxide solvent, spinning conditions and the composition of the coagulation liquid in contact with the extruded filaments after exiting the spinneret the design of the spinneret can vary in order to control effects related to die-swell and coagulation rate. The spinneret holes are characterized by their diameter (D) and land length (L). For certain combinations of spin dope, coagulation liquid and spinning conditions like temperature and extrusion speed it may be advantageous to use different L/D ratios. In one embodiment the L/D ratio may be in the range 0.1-2. For these rather gentle coagulation conditions it is important to avoid lump formation on the spinneret surface, caused by excessive die-swell. The capillaries will thus need to be adapted by increasing their length as solutions become more elastic and when using lower concentrations of salt in the coagulation bath. In one embodiment, for conditions producing large die swell (expansion of the extruded spin dope jet in the radial direction upon exiting the spinneret hole) and slow coagulation, the L/D ratio is preferably larger than 0.5, more preferable larger than 0.8 and most preferably larger or equal to 1.

A preferred embodiment of an alkali recycle system for performing the method disclosed herein is depicted in FIG. 1.

Wet cellulose dissolving pulp recovered directly from a pulp mill bleach plant, optionally after having been activated by procedures for controlling the degree of polymerization, is injected into a cellulose alkali mixing reactor (1). Make up sodium hydroxide and other additives are charged to the reactor as well as sodium hydroxide recycling liquid from the separation unit (8). The cellulose spindope formed in reactor (1) is discharged into dewatering unit (2) installed for adjustment of the cellulose content of the spindope to the desired value. Alkaline effluent from the dewatering unit can be recycled to a chemicals recovery cycle of a pulp mill or be partially recycled into the mixing rector (1).

The spindope is homogenized in a kneader (3) and filtered and deaerated in unit (4). The deaerated spindope is pumped by the pump (5) into the spinneret nozzle (6) submerged in the coagulation bath 7. New cellulosic fiber filaments are formed in the coagulation bath. Filaments are drawn through the bath and discharged for further treatment (9) to become cellulosic filament yarns or cellulosic staple fibers. The coagulation bath comprises sodium hydroxide and sodium carbonate in an aqueous solution. Fresh make up sodium carbonate can be added to the bath. Spent coagulation liquid is discharged from the coagulation bath and is charged into one or more separation units (8) wherein sodium carbonate is separated from the sodium hydroxide mother liquid. The separation unit (8) can comprise a freeze crystallizer and/or a nano filtration unit. Sodium hydroxide mother liquor is recycled to mixing reactor (1). An alkaline stream comprising non process elements can be discharged from one of the separation units in (8) which stream can be piped to a pulp mill chemicals recovery system or an effluent treatment plant.

The new method described herein offers a new method for preparation of cellulosic fibers from an alkaline spinning dope combined with recovery of effective alkali.

The invention claimed is:

1. Method for the recovery of sodium hydroxide in a process for preparation of regenerated cellulosic fibers using aqueous sodium hydroxide as solvent for cellulose or cellulose derivatives dissolving in the manufacture of a cellulosic spinning dope, wherein sodium hydroxide present in the cellulosic spinning dope is at least partially recovered as sodium hydroxide from a coagulation bath into which the cellulosic spinning dope is injected, and wherein die-swell of filaments and coagulation rate of cellulosic moieties in the coagulation bath are controlled by adjusting a spinneret hole diameter (D) and land length (L) to a L/D ratio below 4.

2. The method according to claim 1, wherein the sodium hydroxide recovered from the coagulation bath is directly, or indirectly, recycled to a cellulose dissolving step.

3. The method according to claim 1, wherein the cellulose in the spinning dope is substantially composed of alpha cellulose, or derivatised cellulose.

4. The method according to claim 3, wherein the derivatised cellulose includes one or more of cellulose xanthate, cellulose carbamate and cellulose carbonate.

5. The method according to claim 1, wherein the pH in the coagulation bath is kept above about 6.

6. The method according to claim 5, wherein alkalinity of the coagulation bath is maintained by causticizing with lime, borates or titanates.

7. The method according to claim 1, wherein the coagulation bath comprises sodium carbonate.

8. The method according to claim 7, wherein sodium carbonate in the coagulation bath is separated from a sodium hydroxide present in the cellulosic spinning dope injected into the coagulation bath, the separated sodium carbonate being at least partially recovered and recycled to the coagulation bath.

9. The method according to claim 7, wherein the average concentration of sodium carbonate in the coagulation bath is in the range of 15 to 45% (by weight).

10. The method according to claim 1, wherein the coagulation bath comprises sodium sulphate.

11. The method according to claim 10, wherein sodium sulphate in the coagulation bath is separated from a sodium hydroxide present in the cellulosic spinning dope injected into the coagulation bath, the separated sodium sulphate being at least partially recovered and recycled to the coagulation bath.

12. The method according to claim 1, wherein the coagulation bath comprises an organic solvent.

13. The method according to claim 1, wherein the coagulation bath comprises one or more salts.

14. The method according to claim 1, wherein the average concentration of sodium hydroxide in the coagulation bath is in the range of 2 to 12% (by weight).

15. The method according to claim 1, further comprising washing the regenerated cellulosic fibers with a washing liquid, wherein alkalinity of the washing liquid used to wash the regenerated cellulosic fibers is restored by causticizing with lime, borates or titanates.

16. The method according to claim 1, comprising the step of adding sodium carbonate and/or sodium sulphate to the coagulation bath.

17. The method according to claim 1, wherein the L/D ratio is larger than 0.5.

18. The method according to claim 1, wherein the coagulation bath comprises one or more of aluminum salts, potassium salts, zinc salts and zinc oxide.

* * * * *